US010259055B2

(12) United States Patent
Choi et al.

(10) Patent No.: US 10,259,055 B2
(45) Date of Patent: Apr. 16, 2019

(54) CUTTING INSERT (71) Applicant: KORLOY INC., Seoul (KR)

(72) Inventors: Young-nam Choi, Cheongju-si (KR);
Sang-yong Lee, Cheongju-si (KR);
Sun-yong Ahn, Cheongju-si (KR)

(73) Assignee: KORLOY INC., Seoul (KR)

( * ) Notice: Subject to any disclaimer, the term of this patent is extended or adjusted under 35 U.S.C. 154(b) by 4 days.

(21) Appl. No.: 15/566,546

(22) PCT Filed: Mar. 3, 2016

(86) PCT No.: PCT/KR2016/002128
§ 371 (c)(1),
(2) Date: Oct. 13, 2017

(87) PCT Pub. No.: WO2016/167472
PCT Pub. Date: Oct. 20, 2016

(65) Prior Publication Data
US 2018/0085836 A1    Mar. 29, 2018

(30) Foreign Application Priority Data
Apr. 17, 2015 (KR) .................. 10-2015-0054529

(51) Int. Cl.
B23C 5/02      (2006.01)
B23C 5/10      (2006.01)
(Continued)

(52) U.S. Cl.
CPC ............ *B23C 5/1081* (2013.01); *B23C 5/207* (2013.01); *B23C 5/223* (2013.01); *B23C 2200/0494* (2013.01); *B23C 2200/125* (2013.01)

(58) Field of Classification Search
CPC .......... B23C 2210/08; B23C 2200/367; B23C 2200/0433; B23C 2200/0455;
(Continued)

(56) References Cited
U.S. PATENT DOCUMENTS 6,872,034 B2 * 3/2005 Satran ................ B23C 5/2213
407/103
7,014,396 B2   3/2006 Satran et al.
(Continued)

FOREIGN PATENT DOCUMENTS

CN            1655901 A       8/2005
KR   10-2005-0084127 A        8/2005
(Continued)

*Primary Examiner* — Will Fridie, Jr.
(74) *Attorney, Agent, or Firm* — Rabin & Berdo, P.C.

(57) ABSTRACT

The purpose of the present invention is to provide a cutting insert capable of reducing cutting load and enhancing squareness. A cutting insert, according to one embodiment of the present invention, comprises: first and second end surfaces which face opposite directions to each other and have four corners wherein two ascending corners are placed in one diagonal position, and two descending corners lower than the height of the ascending corners are placed in the remaining diagonal position; first and second main side surfaces which are placed between the first and second end surfaces, face in opposite directions to each other, and have a throughhole connecting the first and second main side surfaces to each other; and first and second auxiliary side surfaces placed between the first and second end surfaces and between the first and second main side surfaces, wherein, when seen from the first or second end surface, each of the first and second main side surfaces comprises: a central main clearance surface placed on a central portion thereof; a first peripheral main clearance surface which is placed between the central main clearance surface and the ascending corners, and which forms an obtuse angle with (Continued)

respect to the central main clearance surface such that the central main clearance surface may protrude; and a second peripheral main clearance surface which is placed between the central main clearance surface and the descending corners, and forms an obtuse angle with respect to the central main clearance surface such that the central main clearance surface may protrude.

17 Claims, 11 Drawing Sheets

(51) Int. Cl.
  *B23C 5/22* (2006.01)
  *B23C 5/20* (2006.01)
(58) Field of Classification Search
  CPC ........ B23C 2200/0494; B23C 2200/20; B23C 2200/28; B23C 5/02
  See application file for complete search history.

(56) References Cited

U.S. PATENT DOCUMENTS

| | | | |
|---|---|---|---|
| 7,094,007 B2 * | 8/2006 | Satran | B23C 5/06 407/113 |
| 7,104,735 B2 * | 9/2006 | Johnson | B23C 5/06 407/113 |
| 7,104,736 B2 | 9/2006 | Satran et al. | |
| 7,246,973 B2 | 7/2007 | Johnson et al. | |
| 8,277,153 B2 * | 10/2012 | Kovac | B23C 5/06 407/103 |
| 8,449,230 B2 * | 5/2013 | Nguyen | B23C 5/109 407/113 |
| 8,876,440 B2 * | 11/2014 | Nam | B23C 5/06 407/113 |
| 9,186,732 B2 * | 11/2015 | Michelet | B23C 5/08 |
| 9,375,793 B2 * | 6/2016 | Brunetto | B23C 5/207 |
| 10,086,447 B2 * | 10/2018 | Nam | B23C 5/207 |

FOREIGN PATENT DOCUMENTS

| | | |
|---|---|---|
| KR | 10-2007-0090877 A | 9/2007 |
| KR | 10-0949660 B1 | 3/2010 |
| KR | 10-2010-0093236 A | 8/2010 |
| KR | 10-1308186 B1 | 9/2013 |
| KR | 10-1380884 B1 | 4/2014 |

* cited by examiner

Prior Art

CUTTING INSERT

TECHNICAL FIELD

The present disclosure relates to a cutting insert.

BACKGROUND ART

Generally, cutting insert is fastened to a cutting tool mounted on the machine tool to be used for cutting a workpiece made of iron, non-ferrous metal, non-metal material or the like.

Such cutting insert typically has an upper surface, a lower surface, and a plurality of side surfaces connecting the upper surface and the lower surface. An upper cutting edge is provided between the side surface and the upper surface, and a lower cutting edge is provided between the side surface and the lower surface.

Figure 8:
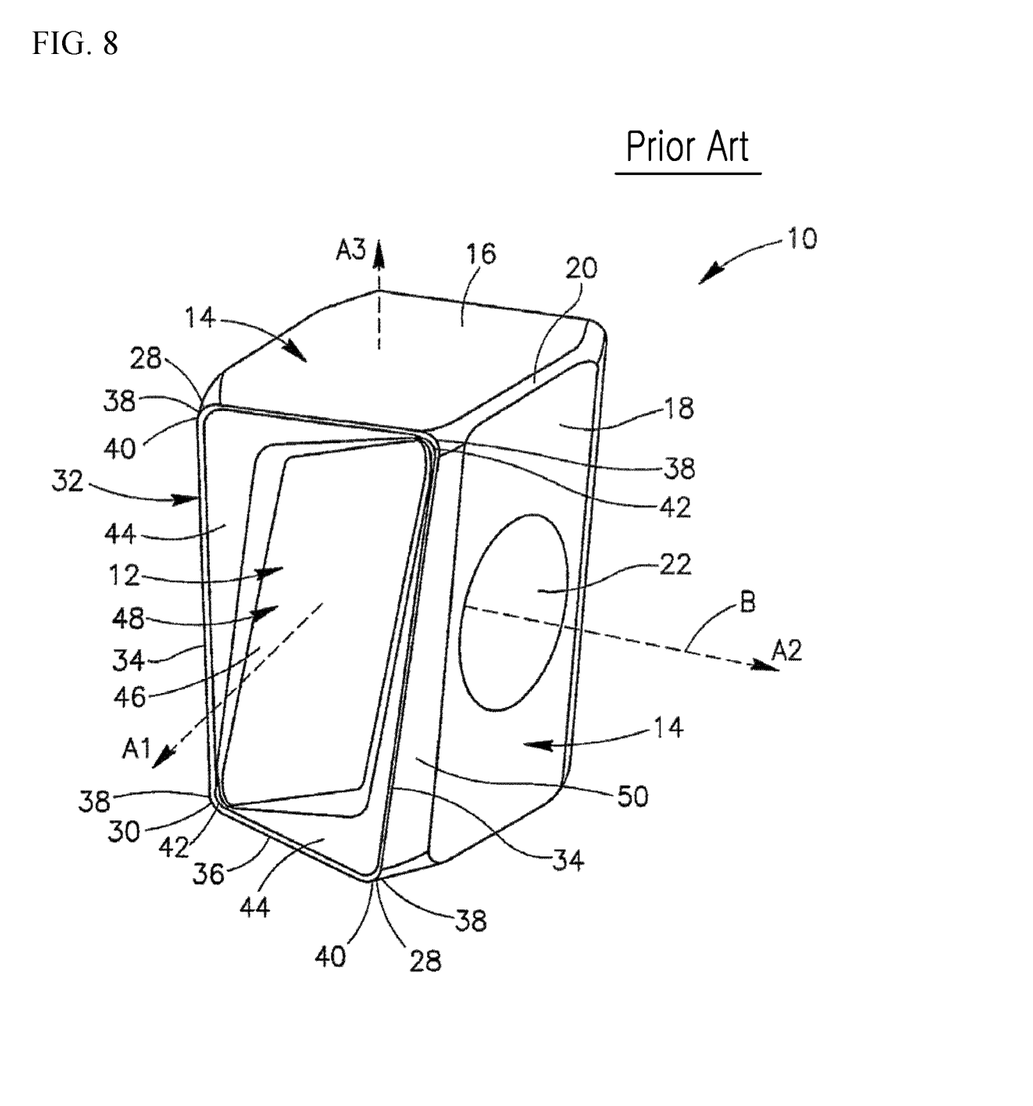
FIG. 8 is a perspective view illustrating a conventional double-sided cutting insert.

An example of the prior art can be found in Korean Registered Patent No. 10-0949660 which discloses a double-sided cutting insert 10 for use in a milling cutter as shown in FIG. 8, which comprises: two identical opposing end surfaces 12; an outer circumferential surface 14 extending therebetween and comprising two opposing identical major side surfaces 18 and two opposing identical minor side surfaces 16; four spaced major cutting edges 34 each formed at the intersections of the respective end surfaces 12 and respective major side surfaces 18; four spaced minor cutting edges 36 each formed at the intersections of the respective end surfaces 12 and respective minor side surfaces 16; and a major relief surface 50 adjacent the respective major cutting edges 34.

Figure 9:
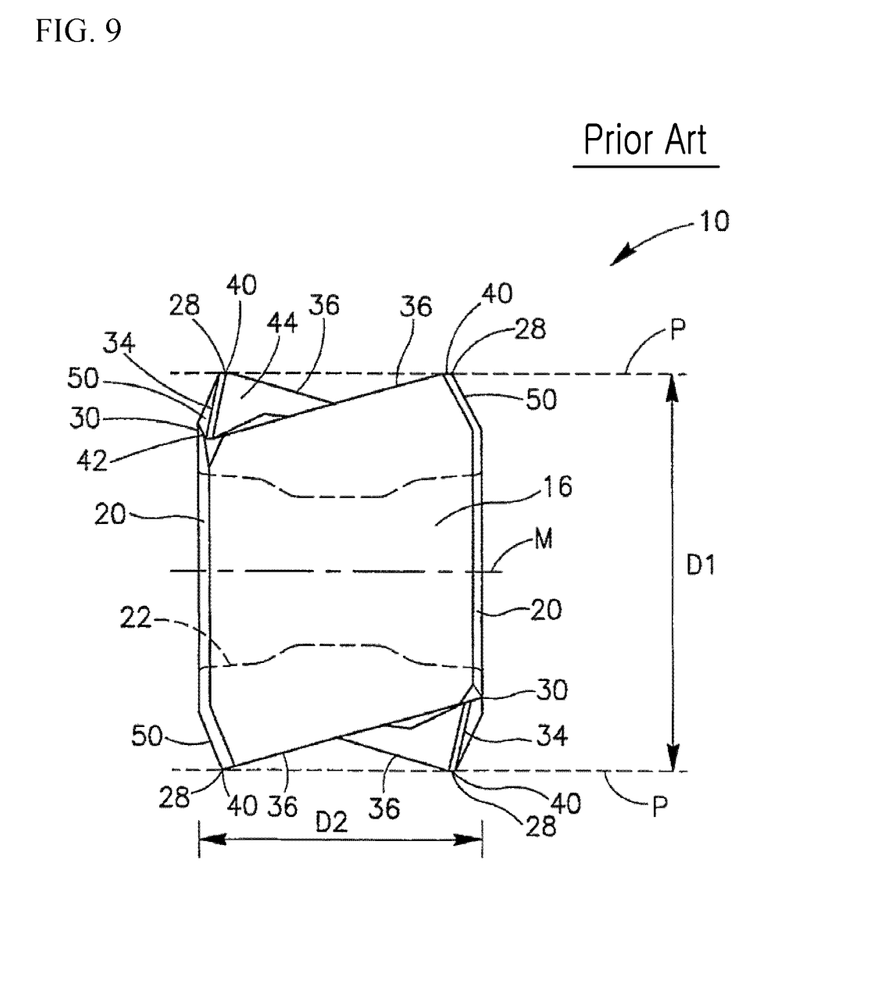
FIG. 9 is a view of the double-sided cutting insert of FIG. 8 seen from the minor side surface.
Figure 10:
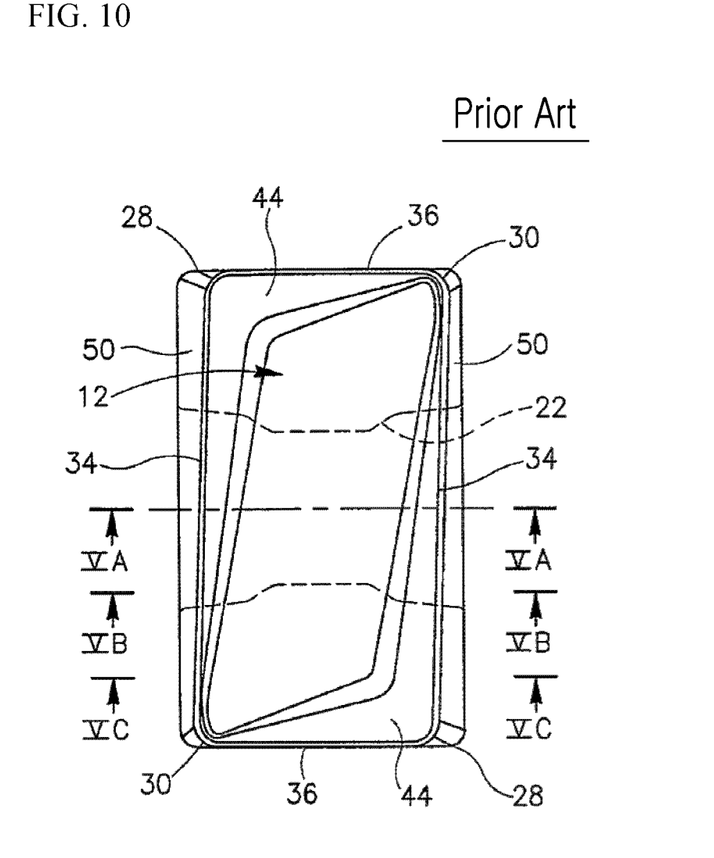
FIG. 10 is a view of the double-sided cutting insert of FIG. 8 seen from the opposing end surface.
Figure 11:
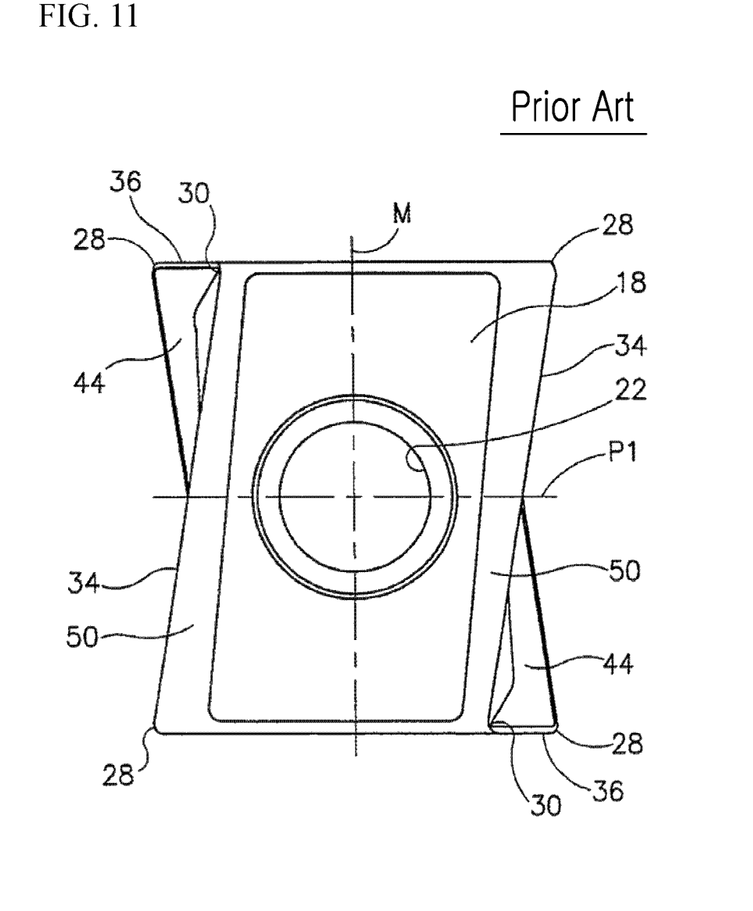
FIG. 11 is a view of the double-sided cutting insert of FIG. 8 seen from the major side surface.

Particularly, the conventional double-sided cutting insert 10 is formed such that, when seen from the end surface 12, as shown in FIG. 10, the major side surface 18 has a generally flat shape, the major cutting edge 34 has a straight line shape and is inclined with respect to the major side surface 18 due to the relief surface 50, and the minor cutting edge 36 has a straight line shape and is perpendicular to the major side surface, according to which the double-sided cutting insert 10 seen from the end surface has a generally rectangular shape. In addition, the conventional double-sided cutting insert 10 is formed such that, when seen from the major side surface 18, as shown in FIG. 11, the major cutting edge 34 has a straight line shape and is inclined with respect to the center line M, according to which the major side surface 18 has a generally parallelogram shape. In addition, when the conventional double-sided cutting insert 10 is seen from the minor side surface 16, as shown in FIG. 9, the minor cutting edge 36 has a straight line shape and is inclined with respect to the center line M. In addition, as shown in FIG. 8, the inner end surface 46 has a shape such that it is closer to a through bore 22 than the major cutting edge 34 and the minor cutting edge 36. That is, the major cutting edge 34 is located higher than the inner end surface 46 serving as a fastening surface.

However, the conventional double-sided cutting insert 10 described above has the problems as described below.

Since the major side surface 18 is generally flat, there is a problem that the cutting load is increased during cutting of the workpiece, which in turn causes a problem that the squareness is reduced.

In addition, when seen from the end surface 12, since the major cutting edge 34 has a straight line shape, there is a limit to increasing the helix angle associated with the cutting performance, which thus causes a structural difficulty in enhancing the cutting performance.

Further, since the double-sided cutting insert 10 seen from the end surface has a generally rectangular shape, there is a problem that the cutting load is increased in the full feeding of workpiece during cutting of the workpiece, which thus causes a problem that the squareness is reduced.

In addition, when seen from the major side surface 18, since the major side surface 18 has a generally parallelogram shape due to the major cutting edge 34 having a straight line shape and being inclined with respect to the center line M, there is a limit to increasing the helix angle associated with the cutting performance, which thus causes a structural difficulty in enhancing the cutting performance.

In addition, when seen from the minor side surface 16, since the minor cutting edge 36 has a straight line shape, there is a structural difficulty in enhancing the surface roughness of the workpiece during cutting process.

DISCLOSURE

Technical Problem

A technical object of the present disclosure is to provide a cutting insert capable of reducing a cutting load and enhance a squareness.

Another technical object of the present disclosure is to provide a cutting insert capable of increasing a helix angle so as to enhance cutting performance.

Yet another technical object of the present disclosure to provide a cutting insert capable of enhancing the edge strength on the side of the ascending corner.

Technical Solution

In order to accomplish the above object, a cutting insert according to an embodiment of the present disclosure is provided, which may include: first and second end surfaces which face in opposite directions and have four corners in which two ascending corners are placed in one diagonal position, and two descending corners lower than the height of the ascending corners are placed in the remaining diagonal position; first and second main side surfaces which are placed between the first and second end surfaces, face in opposite directions, and have a throughhole connecting the same; and first and second auxiliary side surfaces which are placed between the first and second end surfaces and between the first and second main side surfaces, and face opposite directions to each other, in which, when seen from the first or second end surface, each of the first and second main side surfaces comprises: a central main clearance surface placed on a central portion thereof: a first peripheral main clearance surface which is placed between the central main clearance surface and the ascending corners, and forms an obtuse angle with respect to the central main clearance surface so that the central main clearance surface may protrude; and a second peripheral main clearance surface which is placed between the central main clearance surface and the descending corners, and forms an obtuse angle with respect to the central main clearance surface so that the central main clearance surface may protrude.

Further, when seen from the first or second end surface, each of the first and second auxiliary side surfaces comprises: a first auxiliary clearance surface placed between a central portion thereof and the ascending corners; and a second auxiliary clearance surface which is placed between the central portion and the descending corners, while having a shape symmetrical with the first auxiliary clearance surface with respect to the central portion and forming an obtuse angle with respect to the first auxiliary clearance surface.

Further, the cutting insert may further include four main edges formed at intersections between the first and second end surfaces and the first and second main side surfaces, respectively, in which, when seen from the first or second end surface, each of the four main edges may include: a central main cutting edge placed on a central portion thereof; a first peripheral main cutting edge which is placed between the central main cutting edge and the ascending corners, and which forms an obtuse angle with respect to the central main cutting edge such that the central main cutting edge may protrude; and a second peripheral main cutting edge which is placed between the central main cutting edge and the descending corners, and which forms an obtuse angle with respect to the central main cutting edge such that the central main cutting edge may protrude.

In addition, when seen from the first or second end surface, each of the central main cutting edge, the first peripheral main cutting edge, and the second peripheral main cutting edge may have a straight line or convex shape.

Further, the cutting insert may further include four auxiliary edges formed at intersections between the first and second end surfaces and the first and second auxiliary side surfaces, respectively, in which, when seen from the first or second end surface, each of the four auxiliary edges may include: a first auxiliary cutting edge placed between a central portion thereof and the ascending corners; and a second auxiliary cutting edge which is placed between the central portion and the descending corners, while having a shape symmetrical with the first auxiliary cutting edge with respect to the central portion and forming an obtuse angle with respect to the first auxiliary cutting edge.

In addition, when seen from the first or second end surfaces, each of the first and second auxiliary cutting edges may have a straight line or convex shape.

In addition, when seen from the first or second main side surface, the first peripheral main cutting edge, the central main cutting edge, and the second peripheral main cutting edge are sequentially placed in a direction from the respective ascending corners toward the respective descending corners, and the first peripheral main cutting edge may have a curved shape that continues from the ascending corners in a downward direction and is convex or concave outward, and the central main cutting edge may have a curved shape that continues from the first peripheral main cutting edge in a downward direction and is convex or concave outward, and the second peripheral main cutting edge may connect the central main cutting edge and the descending corner and have a straight line shape.

In addition, the first and second end surfaces may each have, at a central portion thereof, a flat fastening surface lower than each ascending corner, and when seen from the first or second main side surface, the second peripheral main cutting edge may be placed in parallel to the fastening surface.

In addition, when seen from the first or second main side surface, the second peripheral main cutting edge may be formed at the same height as the fastening surface.

In addition, when seen from the first or second auxiliary side surface, each of the four auxiliary edges may include: a downward curved portion extending from the ascending corners toward the descending corners; and a straight line portion continued from the downward curved portion and connected to the descending corners.

In addition, the first and second end surfaces may each have, at a central portion thereof, a flat fastening surface lower than each ascending corner, and when seen from the first or second auxiliary side surface, the straight line portion may be parallel to the fastening surface.

In addition, when seen from the first or second auxiliary side surface, the straight line portion may be formed at the same height as the fastening surface.

In addition, when seen from the first or second auxiliary side surface, a boundary between the downward curved portion and the straight line portion may be placed on the first or second auxiliary cutting edge.

In addition, the first and second end surfaces may be rotationally symmetrical by 180 degrees with respect to an axis of the throughhole.

In addition, when seen from the first or second end surface, the cutting insert may have a polygonal shape having ten or more angles.

In addition, an obtuse angle auxiliary clearance surface may be formed on the first auxiliary clearance surface and extends to the first auxiliary cutting edge.

In addition, the obtuse angle auxiliary clearance surface may have a shape such that a width thereof gradually decreases in a direction from the ascending corners toward the descending corners.

Advantageous Effects

As described above, the cutting insert according to the embodiments of the present disclosure can provide the following effects.

According to the embodiments of the present disclosure, in one technical configuration, when seen from the first or second end surface, the central main clearance surface is protruded relative to the first and second peripheral main clearance surfaces being an obtuse angle therewith, and accordingly, the cutting load of the workpiece can be reduced and the squareness of the workpiece can thus be enhanced.

In addition, according to the embodiments of the present disclosure, in one technical configuration, when seen from the first or second main side surface, the first peripheral main cutting edge, the central main cutting edge, and the second peripheral main cutting edge are sequentially placed in a direction from the respective ascending corners toward the respective descending corners, the first peripheral main cutting edge has a curved shape that continues from the ascending corner in a downward direction and is convex outward, and the central main cutting edge has a curved shape that continues from the first peripheral main cutting edge in a downward direction and is convex outward, and the second peripheral main cutting edge connects the central main cutting edge and the descending corner and is placed in parallel to the fastening surface in a straight line shape, such that it is possible to increase the helix angle and enhance the cutting performance.

In addition, according to the embodiments of the present disclosure, it is possible to enhance the edge strength on the side of the ascending corner by applying an obtuse angle auxiliary clearance surface therefor.

BEST MODE

Hereinafter, embodiments of the present disclosure will be described in detail with reference to the accompanying drawings, which will be readily apparent to those skilled in the art to which the present disclosure pertains. However, the present disclosure proposed herein is just a preferable example for the purpose of illustrations only, not intended to limit the scope of the disclosure, so it should be understood that other equivalents and modifications could be made thereto without departing from the scope of the disclosure.

Figure 1:
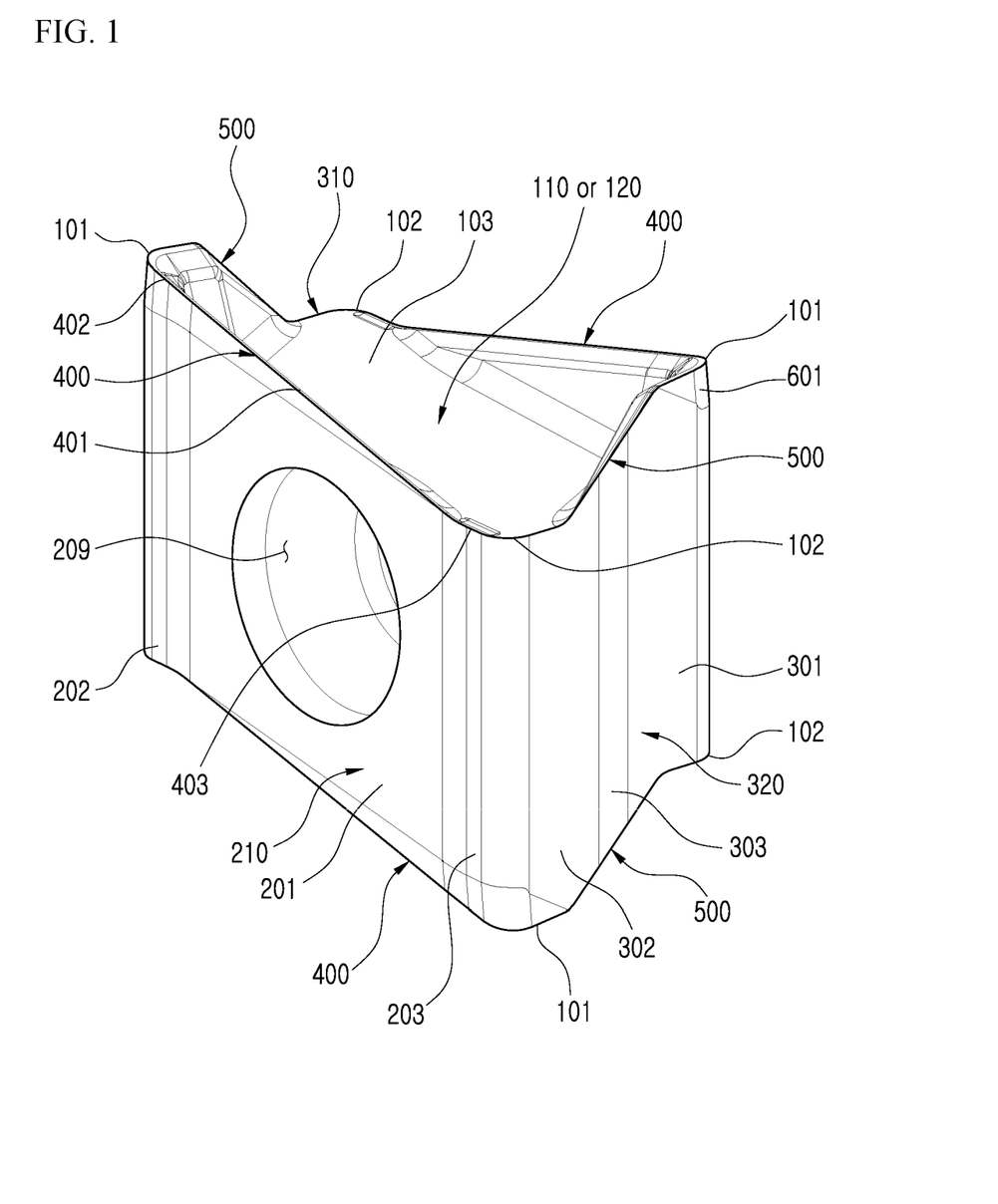
FIG. 1 is a perspective view illustrating a cutting insert according to an embodiment of the present disclosure.
Figure 2:
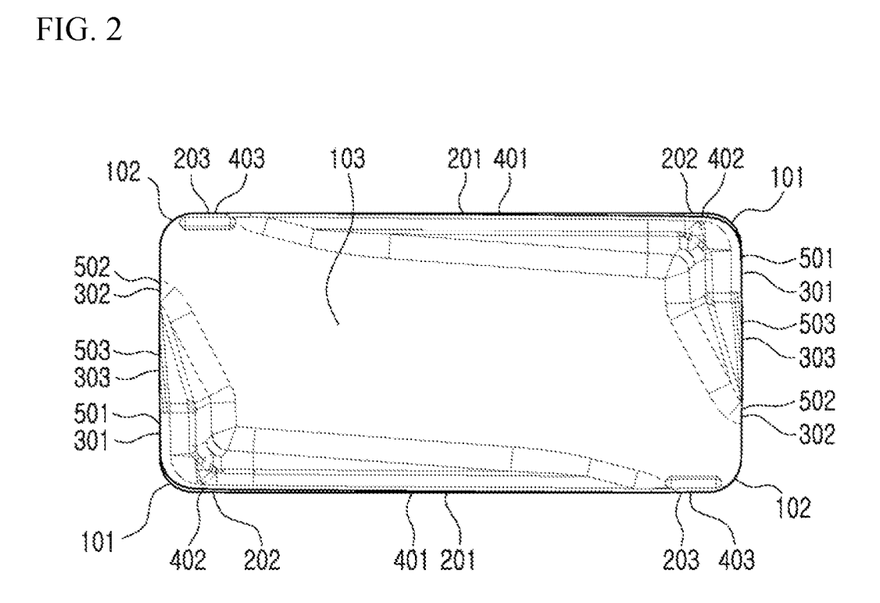
FIG. 2 is a view of the cutting insert of FIG. 1 seen from the first or second end surface.
Figure 3:
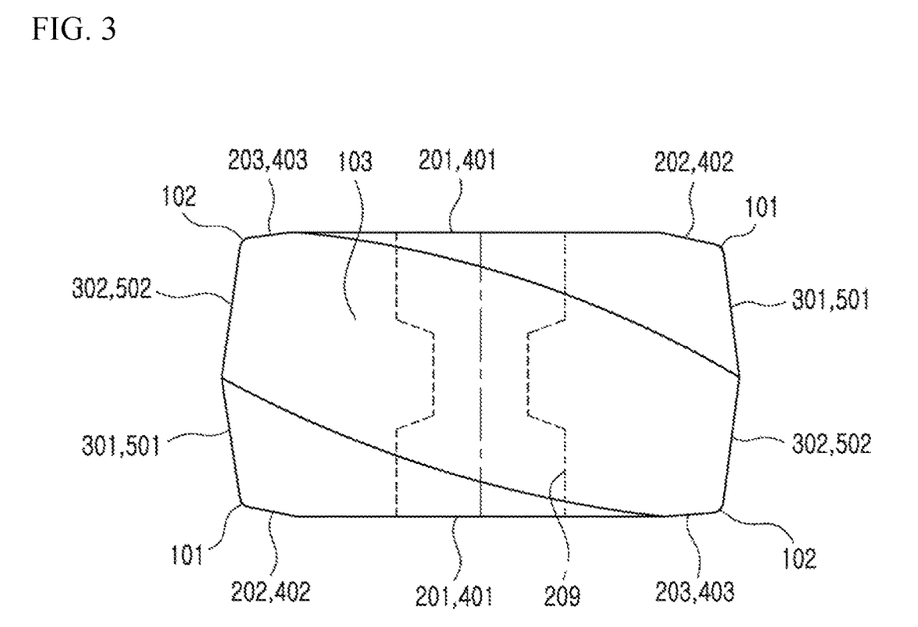
FIG. 3 is a schematic view emphasizing a concept of the angled portions in FIG. 2.

FIG. 1 is a perspective view illustrating a cutting insert according to an embodiment of the present disclosure, FIG. 2 is a view of the cutting insert of FIG. 1 seen from the first or second end surface, and FIG. 3 is a schematic view emphasizing a concept of the angled portions in FIG. 2.

Figure 4:
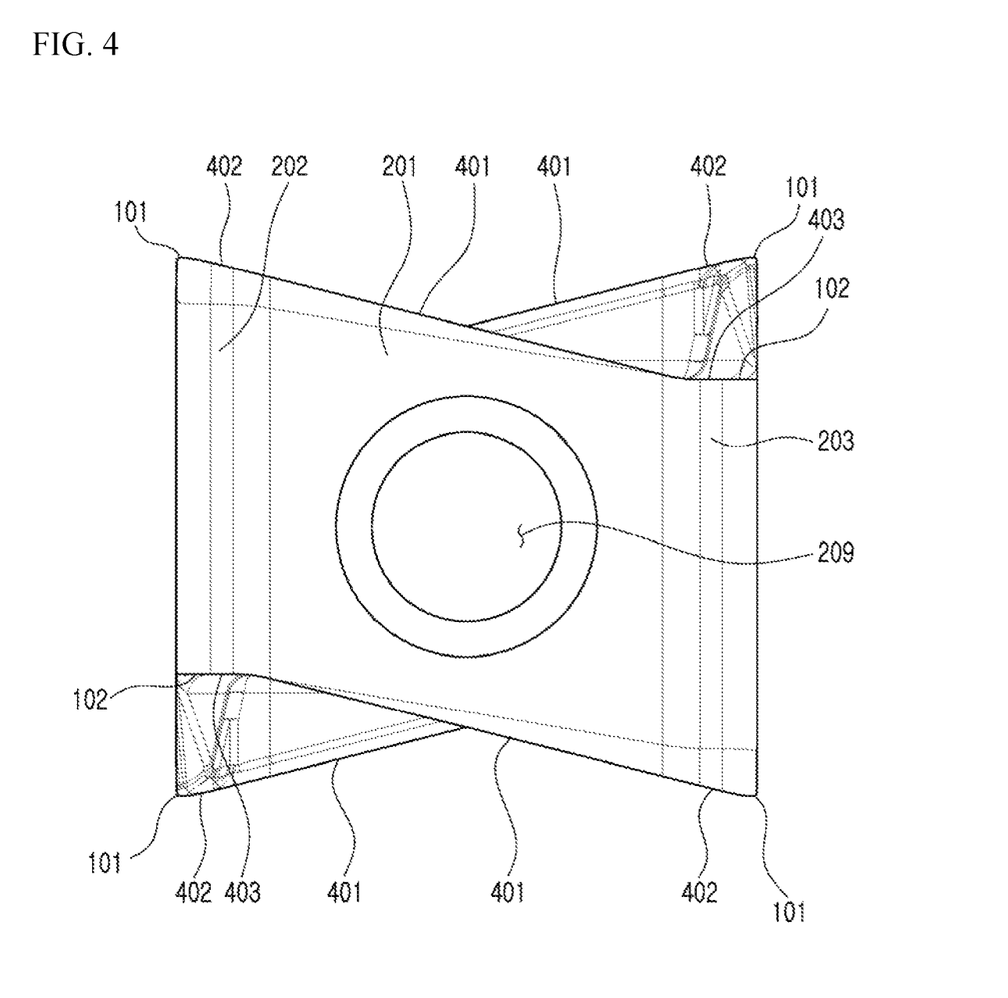
FIG. 4 is a view of the cutting insert of FIG. 1 seen from the first or second main side surface.
Figure 5:
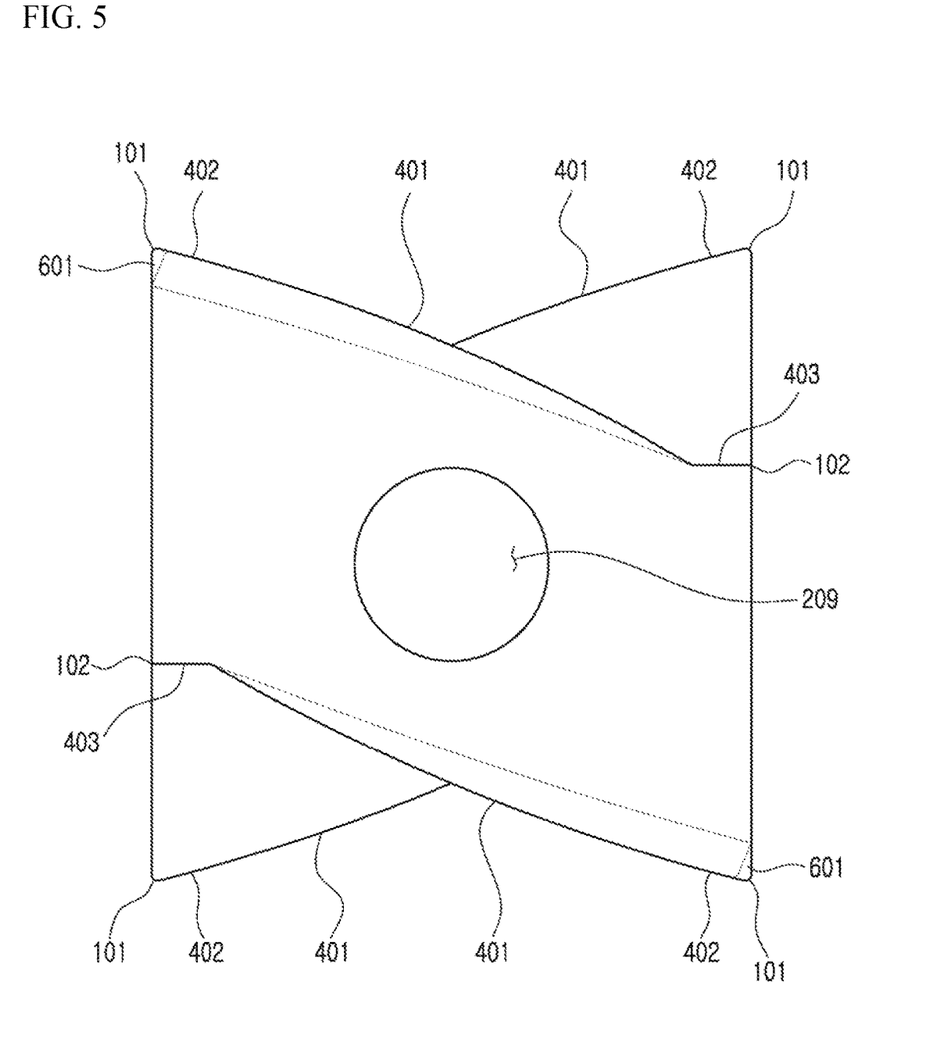
FIG. 5 is a schematic view emphasizing a concept of a first peripheral main cutting edge and downward curved shape of the central main cutting edge of FIG. 4.

FIG. 4 is a view of the cutting insert of FIG. 1 seen from the first or second main side surface, and FIG. 5 is a schematic view emphasizing a concept of a first peripheral main cutting edge and downward curved shape of the central main cutting edge of FIG. 4.

Figure 6:
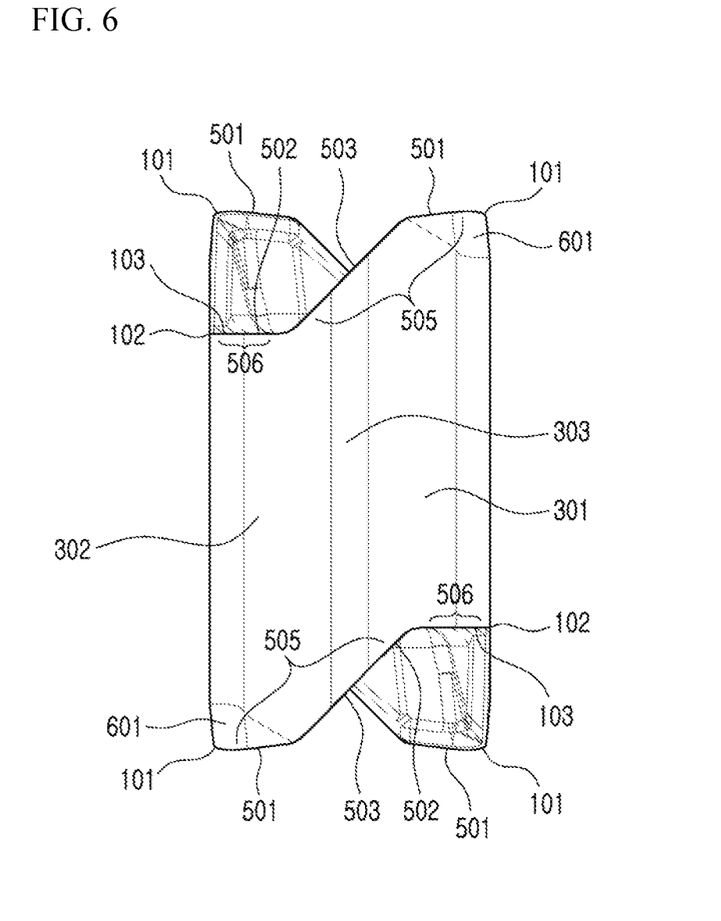
FIG. 6 is a view of the cutting insert of FIG. 1 seen from the first or second auxiliary side surface.
Figure 7:
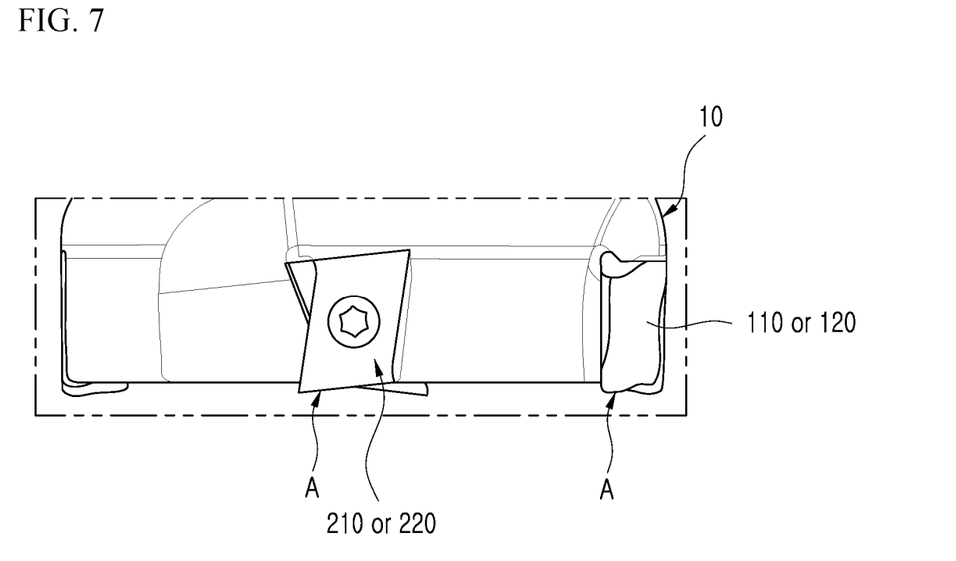
FIG. 7 is a view illustrating the cutting insert of FIG. 1 mounted on a tool holder.

FIG. 6 is a view of the cutting insert of FIG. 1 seen from the first or second auxiliary side surface, and FIG. 7 is a view illustrating the cutting insert of FIG. 1 mounted on a tool holder.

The cutting insert A according to an embodiment of the present disclosure comprises first and second end surfaces 110, 120, first and second main side surfaces 210, 220, and first and second auxiliary side surfaces 310, 320, as shown in FIG. 1 to FIG. 7.

As shown in FIGS. 1 and 2, the first and second end surfaces 110, 120 face opposite directions to each other, and each have four corners in which two ascending corners 101 are placed in one diagonal position, and two descending corners 102 are placed in the remaining diagonal position at a lower height than the ascending corners 101. Further, the first and second end surfaces 110, 120 may be rotationally symmetrical by 180 degrees with respect to an axis of a throughhole 209 to be described below. The first and second end surfaces 110, 120 may each have, at a central portion thereof, a flat fastening surface 103 having a height lower than the ascending corner 101 and same as the descending corner 102. For reference, each of the first and second end surfaces 110, 120 may be used on both surfaces such that one surface used for cutting may be referred to as a "chip break side" from which chip is discharged, and the other surface in the opposite direction to the one surface may be referred to as a "fastening surface" or "mounting surface" that is fastened to the tool holder 10 (see FIG. 7).

As shown in FIGS. 1 and 4, the first and second major side surfaces 210, 220 are placed between the first and second end surfaces 110, 120, face opposite directions to each other, and each have a throughhole 209 for connecting the first and second major side surfaces 210, 220 to each other. That is, the throughholes 209 may pass through the cutting insert A of the present disclosure, and one end and the other end of the throughhole 209 may be placed on the first and second main side surfaces 210, 220, respectively.

As shown in FIGS. 1 and 6, the first and second auxiliary side surfaces 310, 320 are placed between the first and second end surfaces 110, 120 and between the first and second main side surfaces 210, 220, and face opposite directions to each other.

Hereinafter, the first and second main side surfaces 210, 220 will be described in detail with reference to FIGS. 1 to 3.

Each of the first and second main side surfaces 210, 220 includes a central main clearance surface 201, a first peripheral main clearance surface 202, and a second peripheral main clearance surface 203, as shown in FIGS. 1 to 3. Specifically, when seen from the first or second end surface 110 or 120, the central main clearance surface 201 is placed at the central portion of each of the first and second main side surfaces 210, 220, the first peripheral main clearance surface 202 is placed between the central main clearance surface 201 and the ascending corner 101 and forms an obtuse angle with respect to the central main clearance surface 201 such that the central main clearance surface 201 may protrude, and the second peripheral main clearance surface 203 is placed between the central main clearance surface 201 and the descending corner 102 and forms an obtuse angle with respect to the central main clearance surface 201 such that the central main clearance surface 201 may protrude.

Accordingly, in one technical configuration, when seen from the first or second end surfaces 110 or 120, the central main clearance surface 201 is protruded relative to the first and second peripheral main clearance surfaces 202 and 203 being at an obtuse angle therewith, such that the cutting load of the workpiece can be reduced even in the full feeding of workpiece and the squareness of the workpiece can thus be enhanced.

Hereinafter, the first and second auxiliary side surfaces 310, 320 will be described in detail with reference to FIGS. 1 to 3.

Each of the first and second auxiliary side surfaces 310, 320 may include a first auxiliary clearance surface 301 and a second auxiliary clearance surface 302, as shown in FIGS. 1 to 3. Specifically, when seen from the first or second end surface 110 or 120, the first auxiliary clearance surface 301 may be placed between respective central portions of the first and second auxiliary side surfaces 310, 320 and the ascending corners 101, and the second auxiliary clearance surface 302 may be placed between the respective central portions and the descending corners 102, while having a shape symmetrical with the first auxiliary clearance surface 301 and forming an obtuse angle with respect to the first auxiliary clearance surface 301.

Accordingly, in one technical configuration, when seen from the first or second end surface 110 or 120, the first and second auxiliary clearance surfaces 301, 302 form an obtuse angle to each other, with the auxiliary side surfaces 310, 320 protruding respectively such that the cutting load of the workpiece can be reduced and the squareness of the workpiece can thus be enhanced. Specifically, in one technical configuration, each of the auxiliary side surfaces 310, 320 is protruded such that during cutting process, the surface roughness of the workpiece can be enhanced.

In addition, when seen from the first or second end surface 110 or 120, each of the first and second auxiliary side surfaces 310, 320 may further include a central auxiliary clearance surface 303 (FIG. 6) that forms a central portion and that is at an obtuse angle with respect to each of the first and second auxiliary clearance surfaces 301, 302 such that the central portion thereof may protrude.

Hereinafter, referring again to FIGS. 1 to 3, the main edge 400 will be described in detail.

As shown in FIG. 1, the main edge 400 may be formed at each of the intersections between the first and second end surfaces 110, 120 and the first and second main side surfaces 210, 220. Accordingly, total four main edges 400 may be formed. Specifically, each of the four main edges 400 may include a central main cutting edge 401, a first peripheral main cutting edge 402, and a second peripheral main cutting edge 403, as shown in FIGS. 2 and 3. In addition, when seen from the first or second end surface 110 or 120, the central main cutting edge 401 may be placed at the central portion of each main edge core 400, the first peripheral main cutting edge 402 may be placed between the central main cutting edge 401 and the ascending corner 101 and form an obtuse angle with respect to the central main cutting edge 401 such that the central main cutting edge 401 may protrude, and the second peripheral main cutting edge 402 may be placed between the central main cutting edge 401 and the descending corner 102 and form an obtuse angle with respect to the central main cutting edge 401 such that the central main cutting edge 401 may protrude.

Therefore, in one technical configuration, when seen from the first or second end surface 110 or 120, the central main cutting edge 401 is protruded relative to the first and second peripheral main cutting edges 402, 403 being at an obtuse angle therewith such that clearance is formed between the first and second peripheral main cutting edges 402, 403, which are relatively sunken, and the sidewall of the workpiece, and as a result, the cutting load of the workpiece can be reduced even in the full feeding of workpiece and the squareness of the workpiece can thus be enhanced.

In addition, when seen from the first or second end surface 110 or 120, each of the central main cutting edge 401, the first peripheral main cutting edge 402, and the second peripheral main cutting edge 403 may have a straight line or convex shape.

Hereinafter, referring again to FIGS. 1 to 3, the auxiliary edge 500 will be described in detail.

As shown in FIG. 1, the auxiliary edge 500 may be formed at each of the intersections between the first and second end surfaces 110, 120 and the first and second main side surfaces 310, 320. Accordingly, total four auxiliary edges 400 may be formed. Specifically, each of the four auxiliary edges 500 may include a first auxiliary cutting edge 501 and a second auxiliary cutting edge 502, as shown in FIGS. 2 and 3. In addition, when seen from the first or second end surface 110 or 120, the first auxiliary cutting edge 501 may be placed between the central portions of the respective auxiliary edges 500 and the ascending corners 101, and the second auxiliary cutting edge 502 may be placed between the central portions and the descending corners 102, while having a symmetrical shape with the first auxiliary cutting edge 501 with respect to the central portions and forming an obtuse angle with the first auxiliary cutting edge 501.

Therefore, in one technical configuration, when seen from the first or second end surface 110 or 120, the first and second auxiliary cutting edges 501, 502 are formed at an obtuse angle to each other and each of the auxiliary edges 500 is protruded, and as a result, the cutting load of the workpiece can be reduced even in the full feeding of workpiece and the squareness of the workpiece can thus be enhanced. Particularly, in one technical configuration, each of the auxiliary edges 500 is protruded such that the surface roughness of the workpiece can be enhanced.

In addition, when seen from the first or second end surface 110 or 120, each of the first and second auxiliary cutting edges 501, 502 may have a straight line or convex shape.

In addition, when seen from the first or second end surface 110 or 120, each of the four auxiliary edges 500 may further include a central auxiliary cutting edge 503 (FIG. 6) that forms a central portion and that is at an obtuse angle with respect to each of the first and second auxiliary cutting edges 501, 502 such that the central portion thereof may protrude. In addition, when seen from the first or second end surface 110 or 120, the central auxiliary cutting edge 503 may have a straight line or convex shape.

Hereinafter, referring to FIGS. 1, 4 and 5, the first peripheral main cutting edge 402, the central main cutting edge 401, and the second peripheral main cutting edge 403 will be described in more detail.

As shown in FIGS. 4 and 5, when seen from the first or second main side surface 210 or 220, the first peripheral main cutting edge 402, the central main cutting edge 401, and the second peripheral main cutting edge 403 may be sequentially placed in a direction from each ascending corner 101 toward each descending corner 102. Specifically, the first peripheral main cutting edge 402 may have a curved shape that continues from the ascending corner 101 in a downward direction and may be convex or concave outward, and the central main cutting edge 401 may have a curved shape that continues from the first peripheral main cutting edge 402 in a downward direction and may be convex or concave outward, and the second peripheral main cutting edge 403 may connect the central main cutting edge 401 and the descending corner 102 and may have a straight line shape, for example.

Therefore, in one technical configuration, when seen from the first or second main side surface 210 or 220, the first peripheral main cutting edge 402 has a curved shape that continues from the ascending corner 101 in a downward direction and is convex or concave outward, the central main cutting edge 401 has a curved shape that continues from the first peripheral main cutting edge 402 in a downward direction and is convex or concave outward, and the second peripheral main cutting edge 403 connects the central main cutting edge 401 and the descending corner 102 and has a straight line shape, such that the helix angle is increased and the cutting performance is thus enhanced.

In addition, when seen from the first or second main side surface 210 or 220, the second peripheral main cutting edge 403 may be formed in parallel at the same height as the fastening surface 103. Therefore, a greater helix angle than the prior art can be realized, by designing the second peripheral main cutting edge 403 at the same height as the fastening surface 103.

However, since there is a chance that large helix angle may weaken the rigidity of the ascending corner 101 seen from the first or second main side surface 210 or 220, in order to enhance the edge strength on the side of the ascending corner 101, as shown in FIG. 6, the obtuse angle auxiliary clearance surface 601 may be applied as the first auxiliary cutting edge 501. Specifically, as shown in FIG. 6, the obtuse angle auxiliary clearance surface 601 may have a shape in which it 601 extends to first auxiliary cutting edge 501 and is formed at an obtuse angle with respect to the first auxiliary clearance surface 301, while a width of the obtuse angle auxiliary clearance surface 601 gradually decreases in a direction from the ascending corner 101 toward the descending corner 101.

Hereinafter, referring to FIGS. 1 and 6, the four auxiliary edges 500 will be described in more detail.

As shown in FIG. 6, when seen from the first or second auxiliary side surface 310 or 320, each of the four auxiliary edges 500 may include, for example, a downward curved portion 505 extending from the ascending corner 101 toward the descending corner 102, and a straight line portion 506 that is continued from the downward curved portion 505 and connected to the descending corner 102.

Each central portion of the first and second end surfaces 110, 120 has a flat fastening surface 103 having a height lower than the ascending corner 101 and same as the descending corner 102, and when seen from the first and second auxiliary side surface 310 or 320, the straight line portion 506 may be parallel to the fastening surface 103. More specifically, when seen from the first or second auxiliary side surface 310 or 320, the straight line portion 506 may be formed at the same height as the fastening surface 103.

In addition, when seen from the first or second auxiliary side surface 310 or 320, the boundary between the downward curved portion 505 and the straight line portion 506 may be placed on the first or second auxiliary cutting edges 501 or 502.

Meanwhile, as shown in FIG. 3, when seen from the first or second end surface 110 or 120, the cutting insert A according to the embodiment of the present disclosure described above may have an approximately angled shape, i.e., approximately 10-angled shape by the two ascending corners 101, the two descending corners 102, the two obtuse angle portions of the first main side surface 210, the two obtuse angle portions of the second main side surface 220, an obtuse angle portion of the first auxiliary side surface 220, and an obtuse angle portion of the second auxiliary side surface 320 described above.

Further, in another example, when the central auxiliary clearance surface 303 is added to each of the first and second auxiliary side surfaces 310, 320, in which case each of the first and second auxiliary side surfaces 310, 320 is also provided with two obtuse angle portions, the cutting insert may also have an approximately 12-angled shape.

As described above, the cutting insert A according to the embodiment of the present disclosure may have the following effects.

According to an embodiment of the present disclosure, in one technical configuration, when seen from the first or second end surfaces 110 or 120, the central main clearance surface 201 is protruded relative to the first and second peripheral main clearance surfaces 202 and 203 being at an obtuse angle therewith, such that the cutting load of the workpiece can be reduced even in the full feeding of workpiece and the squareness of the workpiece can thus be enhanced.

In addition, according to an embodiment of the present disclosure, in one technical configuration, when seen from the first or second main side surface 210 or 220, the first peripheral main cutting edge 402, the central main cutting edge 401, and the second peripheral main cutting edge 403 are sequentially placed in a direction from the respective ascending corners 101 toward the respective descending corners 102, the first peripheral main cutting edge 402 has a curved shape that continues from the ascending corner 101 in a downward direction and is convex outward, and the central main cutting edge 401 has a curved shape that continues from the first peripheral main cutting edge 402 in a downward direction and is convex outward when seen from the first or second end surface, and the second peripheral main cutting edge 403 connects the central main cutting edge 401 and the descending corner 102 and is placed in parallel to the fastening surface in a straight line shape, for example, such that the helix angle can be increased and the cutting performance can thus be enhanced.

In addition, according to the embodiments of the present disclosure, it is possible to enhance the edge strength on the side of the ascending corner 101 by applying an obtuse angle auxiliary clearance surface therefor.

The present disclosure has been described in detail. However, it should be understood that the detailed description and specific examples, while indicating preferred embodiments of the present disclosure, are given by way of illustration only, since various changes and modifications within the scope of the disclosure will become apparent to those skilled in the art from this detailed description.

INDUSTRIAL APPLICABILITY

The present disclosure relates to a cutting insert, and therefore, is applicable to cutting a workpiece and is thus industrially applicable.

What is claimed is:

1. A cutting insert, comprising:
first and second end surfaces which face opposite directions to each other and have four corners wherein two ascending corners are placed in one diagonal position, and two descending corners lower than the height of the ascending corners are placed in the remaining diagonal position;
first and second main side surfaces which are placed between the first and second end surfaces, face opposite directions to each other, and have a throughhole connecting the first and second main side surfaces to each other; and
first and second auxiliary side surfaces placed between the first and second end surfaces and between the first and second main side surfaces,
wherein, when seen from the first or second end surface, each of the first and second main side surfaces comprises:
a central main clearance surface placed on a central portion thereof;
a first peripheral main clearance surface which is placed between the central main clearance surface and the ascending corners, and which forms an obtuse angle with respect to the central main clearance surface such that the central main clearance surface may protrude; and
a second peripheral main clearance surface which is placed between the central main clearance surface and the descending corners, and forms an obtuse angle with respect to the central main clearance surface such that the central main clearance surface may protrude.

2. The cutting insert of claim 1, wherein, when seen from the first or second end surface, each of the first and second auxiliary side surfaces comprises:

a first auxiliary clearance surface placed between a central portion thereof and the ascending corners; and a second auxiliary clearance surface which is placed between the central portion and the descending corners, while having a shape symmetrical with the first auxiliary clearance surface with respect to the central portion and forming an obtuse angle with respect to the first auxiliary clearance surface.

3. The cutting insert of claim 1, further comprising four main edges formed at intersections between the first and second end surfaces and the first and second main side surfaces, respectively, wherein, when seen from the first or second end surface, each of the four main edges comprises:

a central main cutting edge placed on a central portion thereof;

a first peripheral main cutting edge which is placed between the central main cutting edge and the ascending corners, and which forms an obtuse angle with respect to the central main cutting edge such that the central main cutting edge may protrude; and a second peripheral main cutting edge which is placed between the central main cutting edge and the descending corners, and which forms an obtuse angle with respect to the central main cutting edge such that the central main cutting edge may protrude.

4. The cutting insert of claim 3, wherein, when seen from the first or second end surface, each of the central main cutting edge, the first peripheral main cutting edge, and the second peripheral main cutting edge has a straight line or convex shape.

5. The cutting insert of claim 2, further comprising four auxiliary edges formed at intersections between the first and second end surfaces and the first and second auxiliary side surfaces, respectively, wherein, when seen from the first or second end surface, each of the four auxiliary edges comprises:

a first auxiliary cutting edge placed between a central portion thereof and the ascending corners; and a second auxiliary cutting edge which is placed between the central portion and the descending corners, while having a shape symmetrical with the first auxiliary cutting edge with respect to the central portion and forming an obtuse angle with respect to the first auxiliary cutting edge.

6. The cutting insert of claim 5, wherein, when seen from the first or second end surfaces, each of the first and second auxiliary cutting edges has a straight line or convex shape.

7. The cutting insert of claim 3, wherein, when seen from the first or second main side surface, the first peripheral main cutting edge, the central main cutting edge, and the second peripheral main cutting edge are sequentially placed in a direction from the respective ascending corners toward the respective descending corners, the first peripheral main cutting edge has a curved shape that continues from the ascending corners in a downward direction and is convex or concave outward, the central main cutting edge has a curved shape that continues from the first peripheral main cutting edge in a downward direction and is convex or concave outward, and the second peripheral main cutting edge connects the central main cutting edge and the descending corner and has a straight line shape.

8. The cutting insert of claim 7, wherein the first and second end surfaces each have, at a central portion thereof, a flat fastening surface lower than each ascending corner, and when seen from the first or second main side surface, the second peripheral main cutting edge is placed in parallel to the fastening surface.

9. The cutting insert of claim 8, wherein, when seen from the first or second main side surface, the second peripheral main cutting edge is formed at the same height as the fastening surface.

10. The cutting insert of claim 5, wherein, when seen from the first or second auxiliary side surface, each of the four auxiliary edges comprises:

a downward curved portion extending from the ascending corners toward the descending corners; and a straight line portion continued from the downward curved portion and connected to the descending corners.

11. The cutting insert of claim 10, wherein the first and second end surfaces each have, at a central portion thereof, a flat fastening surface lower than each ascending corner, and when seen from the first or second auxiliary side surface, the straight line portion is parallel to the fastening surface.

12. The cutting insert of claim 11, wherein, when seen from the first or second auxiliary side surface, the straight line portion is formed at the same height as the fastening surface.

13. The cutting insert of claim 10, wherein, when seen from the first or second auxiliary side surface, a boundary between the downward curved portion and the straight line portion is placed on the first or second auxiliary cutting edge.

14. The cutting insert of claim 1, wherein, the first and second end surfaces are rotationally symmetrical by 180 degrees with respect to an axis of the throughhole.

15. The cutting insert of claim 1, wherein, when seen from the first or second end surface, the cutting insert has a polygonal shape having ten or more angles.

16. The cutting insert of claim 5, wherein an obtuse angle auxiliary clearance surface is formed on the first auxiliary clearance surface and extends to the first auxiliary cutting edge.

17. The cutting insert of claim 16, wherein the obtuse angle auxiliary clearance surface has a shape such that a width thereof gradually decreases in a direction from the ascending corners toward the descending corners.

* * * * *